United States Patent [19]

Dorcheus

[11] 4,454,042
[45] Jun. 12, 1984

[54] SOLIDS-LIQUIDS SEPARATION DEVICE

[75] Inventor: Samuel H. Dorcheus, Pelham, Ala.

[73] Assignee: Envirotech Corporation, Salt Lake City, Utah

[21] Appl. No.: 427,086

[22] Filed: Sep. 29, 1982

[51] Int. Cl.³ .............................................. B01D 33/12
[52] U.S. Cl. ...................................... 210/401; 210/402
[58] Field of Search ................................ 210/401, 402

[56] References Cited
FOREIGN PATENT DOCUMENTS 9439 12/1898 Sweden ................................ 210/402
974 of 1872 United Kingdom ................ 210/402
5219 of 1906 United Kingdom ................ 210/402

Primary Examiner—Frank A. Spear, Jr.
Attorney, Agent, or Firm—Robert E. Krebs

[57] ABSTRACT

A rotatable drum solids-liquids separation device having bailer scoop means forming a fluid-holding trough attached to and rotatable with the drum which is operable to pick-up fluid in an internal drum sump and during rotation to lift and transport the fluid to an outlet position higher in elevation than the sump level, normally at the centerline of the drum.

15 Claims, 11 Drawing Figures

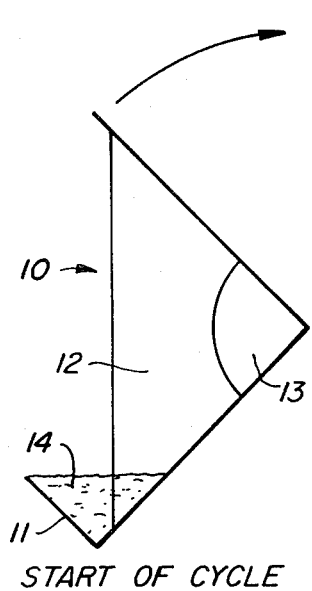
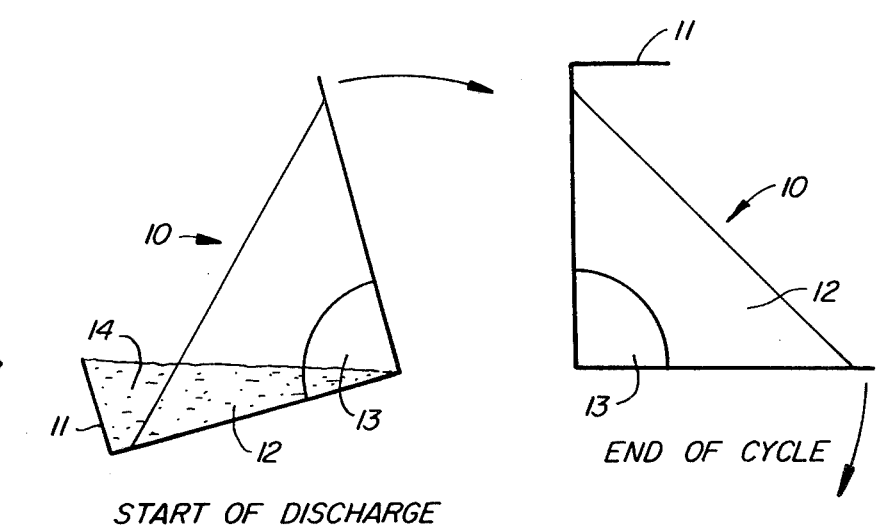
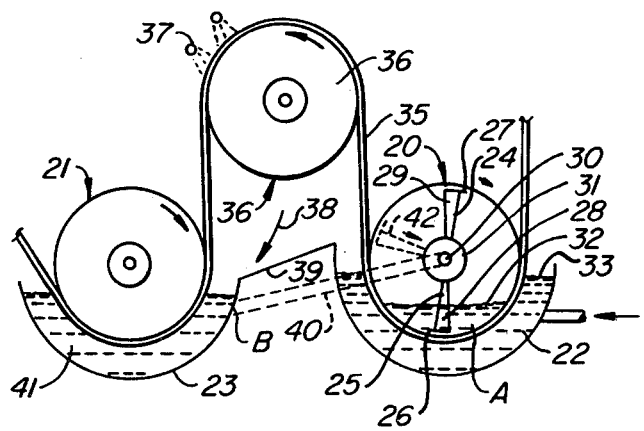
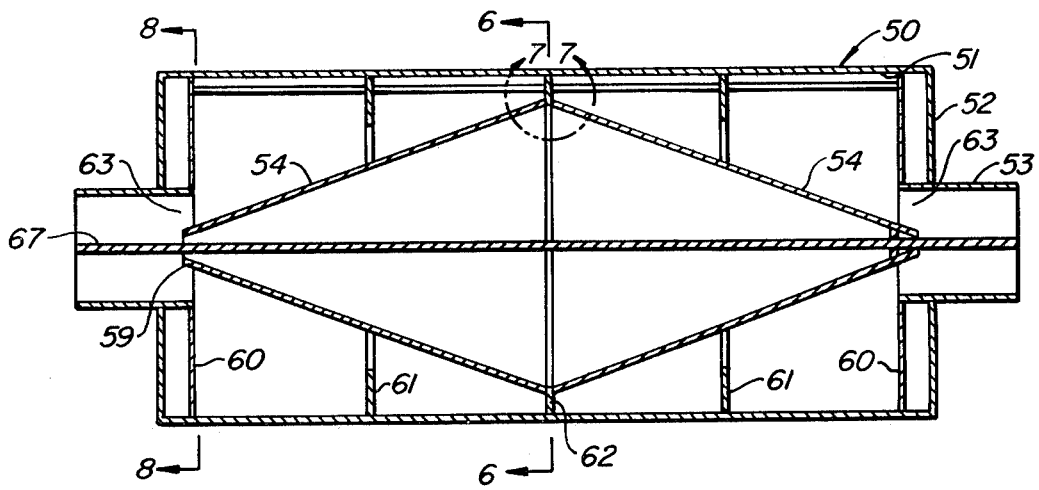

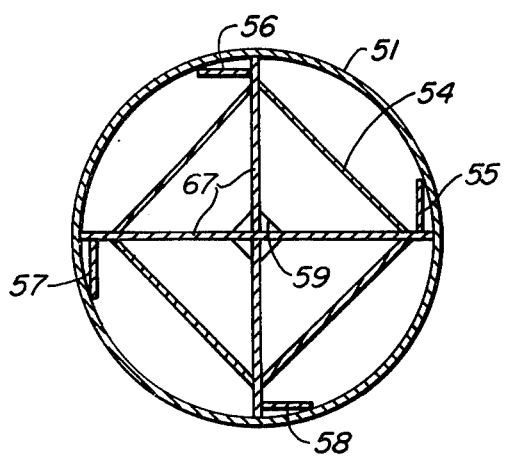
FIG._6.
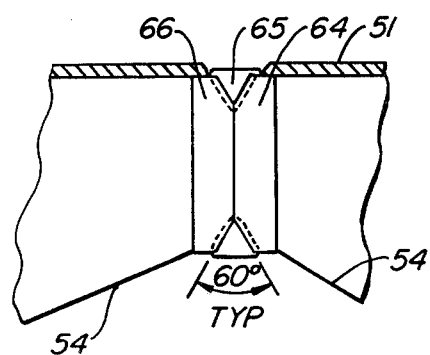
FIG._7.
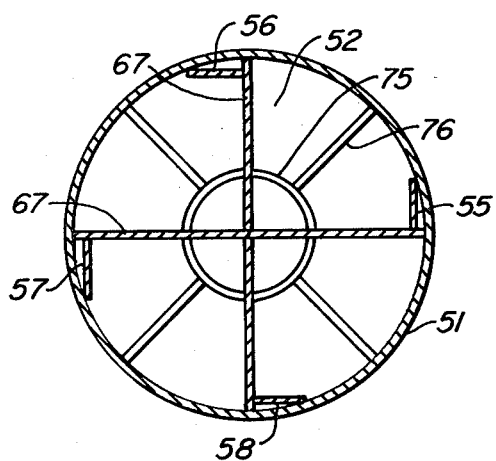
FIG._8.
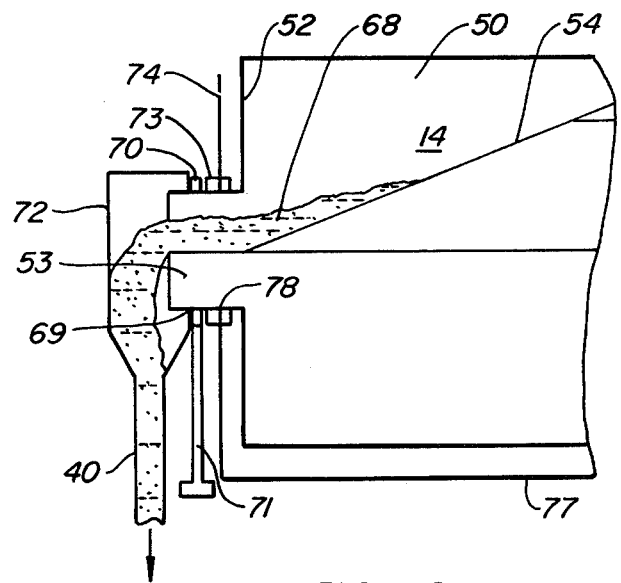
FIG._9.
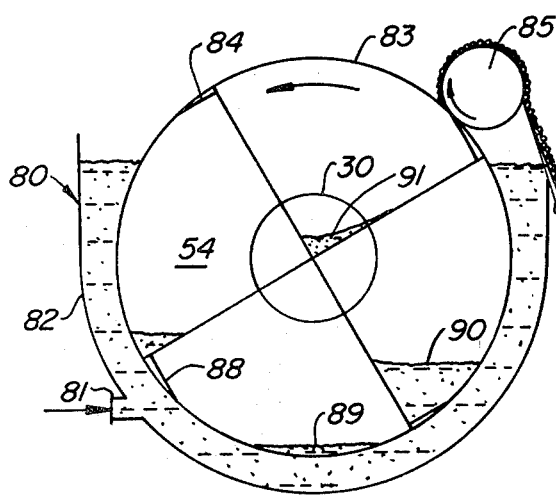
FIG._10.
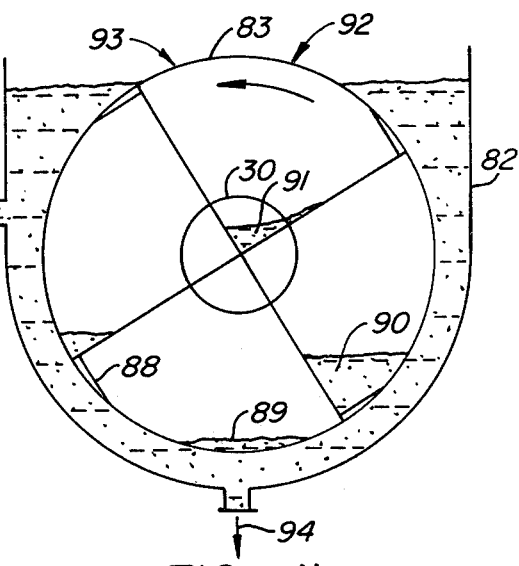
FIG._11.

SOLIDS-LIQUIDS SEPARATION DEVICE

BACKGROUND OF THE INVENTION

This invention concerns a solids-liquids separation apparatus including a rotable cylindrical drum where flow movement of process liquid is provided from a first level of fluid contained within the drum to a higher in elevation level outside the drum. The above function is provided by a series of internal bailers contained within the drum structure.

FIELD OF INVENTION

The present invention relates to a rotary liquids-solids separation drum device particularly to an apparatus for filtering solid particles from a liquid-solid slurry, including washers for pulp and paper stock pulps. The device provides for the movement of fluid from a sump at the bottom of the interior of the rotary drum to a site higher in elevation, namely to a centerline level without the use of pumps.

DESCRIPTION OF PRIOR ART

According to various processes well-known to the art and prior art apparatus, drum filters have been used for many years in which a filter fabric is conveyed about a perforated rotating drum and filtrate is extracted from a mat of slurried solid material on the fabric into the drum interior. A typical arrangement is seen in U.S. Pat. No. 2,745,712 which provides for countercurrent washing of cooking liquor from paper pulp. Such patent shows wash liquor which has been sprayed on the exterior of the drum being conducted through the mat on the outside surface of the drum and through the apertures in the drum into the drum interior. To conserve the wash water being used for the washing cycle and to move the wash water to a preceding drum for countercurrent washing a gravity flow from the drum directly into a lower container by means of drop tubes 2, 4, 6 and 8 is provided. FIG. 5 of the patent particularly shows the movement of the interior wash water into the lower tank.

U.S. Pat. No. 4,160,297 shows a machine and process for washing paper pulp stock and similar free-filtering materials including a series of horizontally disposed wash drums, each mounted in a tank. Two endless filter belts are trained to pass over each of said drums and through liquid contained in each of the tanks. A mat of pulp is formed between endless filter belts and carried under each of the drums for washing therein. Wash liquor passes through the pulp mat as it travels under said drums thereby washing the pulp mat and the liquor passes from drum to drum by gravity flow. Thus in this type of device it is necessary to have the tanks stepped in elevation so that the materials from one tank flows into a lower tank. Likewise, it is necessary to have a mechanism for rising the liquid within the inside of the tank to a succeeding tank. This is accomplished by a series of siphon tubes which extend downwardly into the drum and terminate adjacent to cylindrical sidewalls thereof. A suitable primer means is also needed to provide initial suction to the siphon tubes.

U.S. Pat. No. 4,324,116 shows a further mechanism for conducting wash water from the interior of the drum to another tank through which the drum passes. In this patent a series of radial extending filtrate conduits are disposed within the drum and in operation a rotary valve communicates with the conduits to permit liquid to flow through the apertures in the sidewall of the drum and then from the drum via a port 22. This port is connected to apply vacuum to the apertures and a pump is provided to move the recovered wash liquor to an upstream tank containing a second drum. As can be seen in each of these above patents, flow is either provided by gravity, by suction vacuum or by pumping to remove the fluid within the drum to a higher site outside the drum.

SUMMARY

The present invention is an improved, energy-conserving apparatus for transferring fluid from an interior sump in a drum-type filter or washer to another station in the flow path of the fluid slurry being treated wherein it is desired to move such fluid to a point higher in elevation than the sump level. The above function is performed by one or more fixed bailers fixed to rotate with the drum so as to pick up fluid from the drum sump and discharge the fluid at a higher elevation normally at the drum centerline so that the fluid can then flow by gravity to an upstream or downstream tank or other discharge point. The device acts to pick up fluid from the interior of the drum along the longitudinal length of the drum and move the picked-up fluid laterally along the axis of the drum, as the bailer pick-up means moves in its rotary cycle to a higher elevation and to a point of discharge of the fluid, whereby the fluid is caused to flow by gravity towards an outlet position adjacent the central axis of the drum. The device may also be employed to move fluid coming in one trunnion into the drum sump and then by the bailer action out the other trunnion.

BRIEF DESCRIPTION OF THE DRAWINGS

The present invention may be readily ascertained by the following detailed description and appended drawings which are offered by way of illustration only and not in limitation of the invention, the scope of which is defined by the appended claims and equivalents. In the drawings:

FIG. 1 is an end skeleton view of the bailer structure after the start of the bailer cycle;

FIG. 2 is a similar view at the start of the discharge cycle;

FIG. 3 is a similar view beyond the end of the typical cycle;

FIG. 4 is a partial schematic elevation view of a pulp washing machine according to the present invention;

FIG. 5 is a cross-sectional view of a drum washer utilizing the invention;

FIG. 6 is a view of the drum taken on lines 6—6 of FIG. 5;

FIG. 7 is a partial side view of the joint between the baffle plates making up the discharge trough of the invention;

FIG. 8 is a view of support structure taken on lines 8—8 of FIG. 5;

FIG. 9 is a partial cross-sectional view of the support and outlet structure for the trunnion of a typical drum filter;

FIG. 10 is a schematic elevation view of a gravity decker utilizing the invention; and FIG. 11 is a schematic elevation view of a gravity filter utilizing the invention.

DETAILED DESCRIPTION OF DRAWINGS

A particular utilization of this invention is for pulp washer configurations which employ a wash liquor flow from a drum tank through a slurry mat on a drum to the interior of the drum with subsequent removal of the filtrate from the interior drum sump. In this invention this is done by means of interiorly placed bailers which convey fluid filtrate from the sump to an exit at the drum axis. The bailers rotate with the drum in a rotary cycle and in a first portion of the rotary cycle act to pick up fluid from the fluid sump within the drum and move it upwards to an elevation where it is dischargeable by gravity flow into an outlet contained at the rotation axis of the drum. This is illustrated clearly in relatively rudimentary terms in FIGS. 1–3.

FIG. 1 shows the initial part of the pick-up cycle wherein a bailer 10 having a lip portion 11 functions to pick up fluid within the sump and convey it upwardly in a fluid holding trough 14 formed by the lip portion and a longitudinal-extending baffle 12. The bailer 10 is rotated in the clockwise position about the rotation axis at a fluid outlet 13.

FIG. 2 shows the rotation after approximately 45° travel from the initial pick up. At this point, the tip edge of the lip 11 and the adjacent surface of baffle 12 forming the trough 14 is in a horizontal plane and the slope of the baffle allows fluid to flow down the surface of baffle 12 into outlet 13. By the time the pick-up lip 11 has reached a top vertical position as shown in FIG. 3, discharge of all fluid from the trough 14 has been accomplished and the bailer is ready to make another half revolution and to again pick up and hold fluid from the sump when it has reached the approximate so-called six o'clock position in its rotary movement. The tip edge of the pick-up means 11 will intersect the fluid upper surface in the sump before that position and will scoop the fluid into the trough as it revolves around the bottom part of the rotary cycle. FIG. 1 actually illustrates the cycle as it is leaving the sump with the scooped-up fluid within trough 14.

FIG. 4 illustrates application of the invention to a paper pulp washer. A washer such as typically shown in U.S. Pat. Nos. 4,160,297 and 4,324,116 illustrates countercurrent washing through the utilization of multiple drums and tanks in the pulp washer. FIG. 4 is a partial illustration of a co-current version of an overall pulp washing system. Drums 20 and 21 rotate within fluid tanks 22 and 23. A pair of bailers 24 and 25 are shown in drum 20 only for illustration purposes. Normally, four bailers will be contained in each drum, one in each quadrant, so that the various functions of the bailing device will be simultaneously performed during the entire rotary cycle. Bailers 24 and 25 have bailer pick-up means 26 and 27 extending generally at right angles to the radially extending baffles 28 and 29. The pick-up means are attached to a series of conical or pyramidal baffles which together form troughs which hold the scooped up fluid from sump 32. Sump 32 is at the situs A of the fluid which is desired to be moved to a higher elevation point. As the drum and its attached bailers are rotated clockwise, the combination of the bailer pick-up and the baffles scoop up a volume of sump fluid into the trough and transport it to a higher elevation along the rotary cycle. When the bailer 25, for example, reaches the position illustrated by the dotted lines at 42, the trough is at such an angle so as to allow fluid contained in the trough, formed by the bailer pick-up means and the baffle, to flow by gravity down the baffle towards its apex and length-wise of the drum to an outlet 30 contained in the drum trunnion 31. Fluid which has been raised from situs A flows into the outlet 30 where it is transported by gravity through line 40 to situs B typically the sump 41 of tank 23 through which the other drum 21 rotates. Situs B is at an elevation above situs A but below the elevation of the outlet 30 of such tank 22. Filter belt 35 is pulled through the total system by the rotary motion of the various drums 21 and 22. Illustrated also is top drum 36 which acts as a spray wash drum. Suitable sprays 37 spray wash fluid on the filter belt and its mat of paper or other fibers so that the paper stock may be washed clean of digestor chemicals, for example. Wash water flow 38 from drum 36 may fall by gravity onto incline flowdeck 39 and become part of the fluid in sump 41 within tank 23.

FIG. 5 shows a cross-sectional view of a drum filter including this invention. Drum 50 contains a cylindrical surface 51 which is apertured so as to allow passage of filterable liquid or filtrate through the apertures. Drum ends 52 generally seal the interior of the drum. Centrally of the drum ends at the axis of the drum are trunnions 53 which rotate in suitable trunnion bearings and allow passage of fluid collected in the interior of the drum to an exterior point. Baffles 54 are provided within the drum and are connected to a framework fixedly connected to the drum interior. This framework comprises a first pair of support rings 60 situated at the extremeties of the drum, a second pair of support rings 61 at a midpoint between the central part of the drum and each drum end and a central support ring 62 for supporting a series of baffles which form the fluid-conducting troughs of this invention. Baffles 54 are shown as forming a pair of pyramidal members having abutting base portions at the central portion of the drum at ring 62 at the lateral midpoint of the drum. The apices of the pyramidal baffles extend towards the drum ends of the drum 50 and are in flow communication with a circle sector outlet 63 contained in hub 53. The truncated apex of each of these pyramidal members terminates at a point 59 within the trunnion 53.

FIG. 6 is a view taken at the centerline of the drum 50 and shows the "swastika"-like pickup means 55, 56, 57 and 58 extending around the inner periphery of the cylindrical wall 51 of the drum 50. Pickup lips 55–58 form with the section walls and baffles 54 a longitudinally-extending trough or overall baffle means having a minimum depth at the midpoint of the drum and a maximum depth adjacent the drum outlet at point 59. Section walls 67 give structural integrity and stiffness to the drum as well as providing the sides of the formed trough. Lips 55–58 run generally parallel to the inner periphery of the drum 50 while the surface of the baffles extend inwardly as the baffle progresses from its basepoint to the end of the drum. Section walls 67 form the sides of the trough. Thus, all fluid that is picked up by the pickup means flows outwardly towards the ends of the drums to the circle sector 63 contained in trunnions 53. Baffles 54 forming the bottom of the trough may also be made from two conical members with abutting bases at the midpoint of the drum length with their open apices ending in the trunnions or may be in the form of one cone or pyramid extending the whole length of the drum. In the latter case, outward flow of fluid will occur at one end of the drum only.

FIG. 7 shows a detail of the center ring and the welding of the respective bases of each of the pyramidal sections to that ring. Ring 62 comprises a first ring section 64 and a second ring section 66 joined by a peripheral weld 65. Ring 62 is attached both to the walls of the pyramidal baffle and to the inner peripheral wall of the cylindrical wall section 51 of drum 50.

FIG. 8 shows a view of the drum of FIG. 5 taken on the lines 8—8. The framework on which the pickup scoop means 55-58 is mounted comprises a spider 76 connected to a support ring 75 which is connected to a surface of trunnion 53 and welded to the inner periphery of the cylindrical drum surface 51.

FIG. 9 is a partial view of the support and outlet structure for the trunnion of a typical drum filter incorporating this invention. Trunnion 53 is supported on a trunnion bearing 70 which is supported by a trunnion support 71. Trunnion bearing is provided between the end wall 74 and the tank or vat 77 in which the drum 50 rotates and the trunnion end. A suitable stuffing box 73 is provided around the periphery of the trunnion 53 where it passes through the aperture 78 contained in tank end 74. Extending outwardly from the end of trunnion 53 is an outlet box 72 which receives the filtrate from the interior of the drum which is conveyed to it through the bailer means. No seal is needed at the point of entrance of the trunnion into outlet box 72 unlike prior art devices. Fluid picked up by lips 55-58 flow into trough 14 and are conveyed down the slope of baffles 54 towards the apex of the conical or pyramid members forming the baffle structure. Filtrate 68 thus flows towards that apex and is discharged into outlet box 72 and falls by gravity downwardly through pipe 40 to any appropriate site.

FIG. 10 shows a gravity decker or thickener used in the pulp and paper industry or in other industries where thickening of slurries are desired. Appropriate feed is fed into an inlet 81 in a semicylindrical tank 82 containing a rotary drum 83. Filtrate from the liquid solid slurry contained between the drum and the tank flows through the perforated drum surface and forms inner sump 89. Bailer pickup means 88 scoops up the fluid filtrate within the drum and picks up a volume 90 of such fluid and conveys it upwardly to a discharge point at a portion of the rotary cycle above the horizontal. Filtrate is shown at 91 flowing into outlet 30. A mat is shown formed on the surface of the drum 83 which is transferred to couch roll 85. A doctor blade 86 scrapes off the fibrous mat from roll 85 and the desired product 87 is transferred to further operations. Filtrate 91 is removed through outlet port 30 as shown in FIG. 9, for example.

FIG. 11 shows a gravity filter 92 which also may use the present invention. In this embodiment, feed is transferred by inlet 81 to tank 82 in which a drum 83 rotates. A portion of the liquid contained in the liquid-slurry within the space between the tank 82 and drum 83 is conducted by vacuum or hydrostatic head into an interior portion of drum 83 forming a filtrate volume in sump 89. Pickup means 88 scoops up the filtrate liquid in the sump in its particular quadrant and moves a volume 90 of that sump fluid around with tank 82 to and above the horizontal position of the pickup means to a point which it can be discharged as at 91 into the outlet port. As the filtrate is removed from the tank, other filtrate comes into the succeeding quadrants and the material in the space between the tank 82 and drum 83 increases in percent solids. Thickened slurry exits the tank 82 by outlet 94. For example, this particular modification may be used as a black liquor filter for removing fiber from black liquor prior to its evaporation.

It is also contemplated that the bailer of this invention may be just one segment of a quadrant in which a triangular baffle or floor is provided between two radial walls extending from the axis of a drum to the drum outer cylindrical surface over a desired length of drum. A scoop lip picks up filtrate in a trough formed by the baffle, the radial walls and end walls of the drum. The apex of the baffle leads into a drain tube at the drum trunnion for discharge of the filtrate.

I claim:

1. In a solids-liquid separation apparatus including a rotatable longitudinally-extending cylindrical drum wherein flow movement of a process fluid from situs A within the cylindrical drum to a higher in elevation situs B outside the drum is desired and wherein said cylindrical drum includes a fluid sump at Situs A within the drum, the improvement which comprises:
    (a) bailer scoop means connected to, situate within and extending longitudinally within said cylindrical drum and operable to move into said sump and pick-up fluid therein;
    (b) means to rotatively move said bailer scoop means with said drum in a rotary cycle to an elevated fluid discharge position;
    (c) an imperforate trough including transverse section walls forming sides of said trough connected to and extending generally co-extensive with said scoop means in said drum and including a sloped trough bottom between said trough sides to laterally flow said fluid; and
    (d) outlet means connected to said drum on at least one end of said drum to convey fluid discharging from said scoop means and said trough to situs B, said trough holding fluid in one portion of said rotary cycle and discharging fluid in a subsequent portion of said rotary cycle.

2. The invention as set forth in claim 1 in which said outlet means comprises an open fluid-conveying hub at the rotative axis of the drum.

3. The invention as set forth in claim 2 in which said bailer scoop means includes a baffle means forming the bottom of said trough, said baffle means extending from one edge of said bailer scoop means to the other edge and terminating with one edge of the baffle means in flow communication with said hub.

4. The invention as set forth in claim 3 in which said bailer scoop means includes a longitudinal extending baffle to convey picked-up fluid to said outlet means and a longitudinal extending pick-up means fixed to said baffle and extending in juxtaposed clearance with the inner peripheral surface of said drum to form, with said baffle, said fluid-holding trough; and in which said baffle is a conical member with its apex extending toward and in flow communication with said outlet means.

5. The invention as set forth in claim 3 in which said bailer scoop means includes a longitudinal extending baffle to convey picked-up fluid to said outlet means and a longitudinal extending pick-up means fixed to said baffle and extending in juxtaposed clearance with the inner peripheral surface of said drum to form, with said baffle, said fluid-holding trough; and in which said baffle is a pyramidal member with its apex extending toward and in flow communication with said outlet means.

6. The invention as set forth in claims 4 or 8 in which a series of pick-up means are provided spaced around the periphery of said member, providing for multiple troughs around the member periphery whereby pick-up and discharge of fluid may simultaneously occur in different troughs.

7. The invention as set forth in claim 1 in which said bailer scoop means includes a longitudinal extending baffle to convey picked-up fluid to said outlet means and a longitudinal extending pick-up means fixed to said baffle and extending in juxtaposed clearance with the inner peripheral surface of said drum to form, with said baffle, said fluid-holding trough.

8. The invention as set forth in claim 1 in which said bailer scoop means includes a baffle means forming the bottom of said trough, said baffle means extending from one edge of said bailer scoop means to the other edge and terminating with one edge of the baffle means in flow communication with said outlet means; and in which said baffle means comprises two substantially pyramidal baffles having abutting base portions fixedly connected at a lateral mid-point of said drum, said outlet means including a pair of open hubs at opposite axis of said drum, the apices of said pyramidal baffles extending toward and being in flow communication with said hubs, whereby picked-up fluid from said fluid sump flows downwardly down the exterior surfaces of said pyramidal baffles into said outlet means.

9. A paper pulp washer comprising:
(a) a wash drum having a sidewall through which liquid can pass to the interior of the drum and end closure walls, said drum being mounted for rotation about its horizontal axis;
(b) a filter belt trained over a portion of the exterior of said sidewall to hold a mat of solid material to be washed;
(c) a fluid sump formed at the lower horizontal confines of said rotatable drum;
(d) means for passing wash fluid through said mat into said sump;
(e) a drum outlet connected to at least one end of said drum and extending above said sump;
(f) a bailer scoop means extending within said drum and connected for rotating with said drum and into said sump in a first portion of a rotary cycle; and
(g) said bailer scoop means including baffle means forming a horizontal fluid-holding trough when said baffle means has a vertical ascending directional component and laterally flowing and discharging fluid from said trough into said drum outlet in a second portion of said rotary cycle, said trough including a bottom sloped toward said drum outlet.

10. The invention as set forth in claim 9 in which said drum is mounted on trunnions and said outlet means is a circle sector within said trunnions.

11. A paper pulp washer comprising:
(a) a wash drum having a sidewall through which liquid can pass to the interior of the drum and end closure walls, said drum being mounted for rotation about its horizontal axis;
(b) a filter belt trained over a portion of the exterior of said sidewall to hold a mat of solid material to be washed;
(c) a fluid sump formed at the lower horizontal confines of said rotatable drum;
(d) means to pass wash fluid through said mat into said sump;
(e) a bailer scoop means including:

(i) a framework extending horizontally along the interior of said drum and connected to rotate with said drum in a rotary cycle;
(ii) baffle means connected to said framework to form a discrete open-top liquid container extending lengthwise of the drum and;
(iii) pick-up means fixedly mounted to said baffle means and extending horizontally with said framework, into said sump;
(e) a bailer scoop means including:
(i) a framework extending horizontally along the interior of said drum and connected to rotate with said drum in a rotary cycle;
(ii) baffle means including a sloped bottom surface connected to said framework to form a discrete open-top liquid container extending lengthwise of the drum and;
(iii) pick-up means fixedly mounted to said baffle means and extending horizontally with said framework, said pick-up means extending into said sump during a first portion of said rotary cycle and, with said baffle means, forming a horizontal fluid-holding trough when said pick-up means has a vertical ascending directional component;
(f) drum outlet means connected to at least one end of said drum and being in lateral flow communication with said sloped bottom of said trough, picked-up fluid in said trough being dischargeable into said outlet means when the plane between a cantilevered edge of said pick-up means and an opposite edge of the trough passes its horizontal position into a descending direction of a second portion of said rotary cycle.

12. The invention as set forth in claim 11 including a series of said baffle means and pick-up means forming multiple troughs around the periphery of said framework whereby fluid from said sump may be picked-up and discharged in syncronism by different troughs.

13. A paper pulp washer comprising:
(a) a wash drum having a sidewall through which liquid can pass to the interior of the drum and end closure walls, said drum being mounted for rotation about its horizontal axis;
(b) a filter belt trained over a portion of the exterior of said sidewall to hold a mat of solid material to be washed;
(c) a fluid sump formed at the lower horizontal confines of said rotatable drum;
(d) means for passing wash fluid through said mat into said sump;
(e) a drum outlet connected to at least one end of said drum and extending above said sump;
(f) a bailer scoop means extending within said drum and connected for rotating with said drum and into said sump in a first portion of a rotary cycle; and
(g) said bailer scoop means including baffle means forming a horizontal fluid-holding trough when said baffle means has a vertical ascending directional component and laterally flowing and discharging fluid from said trough into said drum outlet in a second portion of said rotary cycle, said trough including a bottom sloped toward said drum outlet and transverse section walls in said drum forming the sides of said trough and in which the bottom of said baffle means are triangular in plan view and are mounted on a slope from the horizontal whereby picked-up fluid flows down the slope of said baffle means to said drum outlet means.

14. A paper pulp washer comprising:
(a) a wash drum having a sidewall through which liquid can pass to the interior of the drum and end closure walls, said drum being mounted for rotation about its horizontal
(b) a filter belt trained over a portion of the exterior of said sidewall to hold a mat of solid material to be washed;
(c) a fluid sump formed at the lower horizontal confines of said rotatable drum;
(d) means for passing wash fluid through said mat into said sump;
(e) a drum outlet connected to at least one end of said drum and extending above said sump;
(f) a bailer scoop means extending within said drum and connected for rotating with said drum and into said sump in a first portion of a rotary cycle; and
(g) said bailer scoop means including baffle means forming a horizontal fluid-holding trough when said baffle means has a vertical ascending directional component and laterally flowing and discharging fluid from said trough into said drum outlet in a second portion of said rotary cycle, said trough including a bottom sloped toward said drum outlet and in which said baffle means is a conical member with its apex extending toward and in flow communication with said outlet means.

15. A paper pulp washer comprising:
(a) a wash drum having a sidewall through which liquid can pass to the interior of the drum and end closure walls, said drum being mounted for rotation about its horizontal axis;
(b) a filter belt trained over a portion of the exterior of said sidewall to hold a mat of solid material to be washed;
(c) a fluid sump formed at the lower horizontal confines of said rotatable drum;
(d) means for passing wash fluid through said mat into said sump;
(e) a drum outlet connected to at least one end of said drum and extending above said sump;
(f) a bailer scoop means extending within said drum and connected for rotating with said drum and into said sump in a first portion of a rotary cycle; and
(g) said bailer scoop means including baffle means forming a horizontal fluid-holding trough when said baffle means has a vertical ascending directional component and laterally flowing and discharging fluid from said trough into said drum outlet in a second portion of said rotary cycle, said trough including a bottom sloped toward said drum outlet and in which said baffle means is a pyramidal member with its apex extending toward and in flow communication with said outlet means.

* * * * *